(12) United States Patent
Williamson et al.

(10) Patent No.: US 9,079,305 B2
(45) Date of Patent: Jul. 14, 2015

(54) MONITORING ROBOT SENSOR CONSISTENCY

(71) Applicants: Matthew Murray Williamson, Marblehead, MA (US); Michael Sussman, Winchester, MA (US); Waleed A. Farahat, Newton, MA (US)

(72) Inventors: Matthew Murray Williamson, Marblehead, MA (US); Michael Sussman, Winchester, MA (US); Waleed A. Farahat, Newton, MA (US)

(73) Assignee: Rethink Robotics, Inc., Boston, MA (US)

( * ) Notice: Subject to any disclaimer, the term of this patent is extended or adjusted under 35 U.S.C. 154(b) by 135 days.

(21) Appl. No.: 14/012,389

(22) Filed: Aug. 28, 2013

(65) Prior Publication Data
US 2014/0067124 A1    Mar. 6, 2014

Related U.S. Application Data

(60) Provisional application No. 61/693,981, filed on Aug. 28, 2012.

(51) Int. Cl.
G05B 19/4062    (2006.01)
B25J 9/16    (2006.01)
G05B 19/406    (2006.01)

(52) U.S. Cl.
CPC .............. B25J 9/1653 (2013.01); B25J 9/1641 (2013.01); B25J 9/1674 (2013.01); B25J 9/1694 (2013.01); G05B 19/406 (2013.01); G05B 19/4062 (2013.01); G05B 2219/14039 (2013.01); G05B 2219/14076 (2013.01); G05B 2219/31294 (2013.01); G05B 2219/39186 (2013.01); G05B 2219/40229 (2013.01); G05B 2219/42329 (2013.01)

(58) Field of Classification Search
CPC . B25J 9/1674; B25J 9/1694; B60T 2270/413; G05B 19/406; G05B 19/4062; G05B 2219/14039; G05B 2219/14076; G05B 2219/31294; G05B 2219/40229
See application file for complete search history.

(56) References Cited

U.S. PATENT DOCUMENTS

| | | | |
|---|---|---|---|
| 5,650,704 | A | 7/1997 | Pratt et al. |
| 7,353,096 | B2 | 4/2008 | Hayashi |
| 8,090,475 | B2 | 1/2012 | Blanc et al. |
| 8,090,552 | B2 | 1/2012 | Henry et al. |
| 8,214,101 | B2 | 7/2012 | Carlton et al. |

FOREIGN PATENT DOCUMENTS

| | | |
|---|---|---|
| DE | 102008019104 A1 | 5/2009 |
| EP | 0269373 A2 | 6/1988 |

(Continued)

OTHER PUBLICATIONS

Zhang, X. et al. "Sensor Bias Fault Isolation in a Class of Nonlinear Systems," IEEE Transactions on Automatic Control, vol. 50, Issue No. 3, pp. 370-376 (Mar. 2005).

(Continued)

*Primary Examiner* — Spencer Patton
(74) *Attorney, Agent, or Firm* — Morgan, Lewis & Bockius LLP

(57) ABSTRACT

Sensors associated with a robot or sub-system thereof (e.g., a series elastic actuator associated with a robot joint) may be monitored for mutual consistency using one or more constraints that relate physical quantities measured by the sensors to each other. The constraints may be based on a physical model of the robot or sub-system.

27 Claims, 6 Drawing Sheets

(56) References Cited

FOREIGN PATENT DOCUMENTS

| | | |
|---|---|---|
| EP | 1927440 A1 | 6/2008 |
| WO | WO-0242720 A2 | 5/2002 |

OTHER PUBLICATIONS

Andreasen, D. S. et al. "Exoskeleton for Forearm Pronation and Supination Rehabilitation," Proceedings of the 26th Annual International Conference of the IEEE EMBS, vol. 3, pp. 2714-2717 (Sep. 1, 2004).

Visinsky, M. L. et al. "A Dynamic Fault Tolerance Framework for Remote Robots," IEEE Transactions on Robotics and Automation, vol. 11, Issue No. 4, pp. 477-490 (Aug. 1995).

International Search Report and Written Opinion of the International Searching Authority for International Application No. PCT/US2013/057078, issued Oct. 24, 2013 and mailed Oct. 31, 2013.

Alag, S. et al. "A methodology for intelligent sensor measurement, validation, fusion, and fault detection for equipment monitoring and diagnostics," AI Edam, vol. 15, pp. 307-320 (Sep. 2001).

Garimella P. "Robust Model-Based Fault Detection Using Adaptive Robust Observers," Proceedings of the 44th IEEE Confererence on Decision and Control, and the European Control Conference 2005 Seville, Spain, pp. 3073-3078 (Dec. 12-15, 2005).

Soika, M. et al. "A Sensor Failure Detection Framework for Autonomous Mobile Robots," Proc. IROS, IEEE, pp. 1735-1740 (1997).

MONITORING ROBOT SENSOR CONSISTENCY

CROSS-REFERENCE TO RELATED APPLICATION

The present application claims priority to and the benefit of, and incorporates herein by reference in its entirety, U.S. Provisional Application No. 61/693,981, filed on Aug. 28, 2012.

TECHNICAL FIELD

The present invention pertains to the safety of robot operation, in particular, under sensor failure conditions.

BACKGROUND

Industrial robots often have powerful actuators that move large and heavy objects, and are controlled under feedback from sensor measurements (e.g., from encoders, position sensors, torque sensors, etc.). If the sensors fail, the robot is out of control, which can result in fast and dangerous robot movements. Accordingly, it is important to detect any sensor failure to initiate proper fail-safe procedures—and, if necessary, initiate robot shutdown.

Sensors can fail in a variety of different ways, some of which (such as, e.g., out-of-range sensor values) are relatively easy to detect whereas others (such as, e.g., sensor values that are plausible, but wrong) are more difficult to spot. To date, two main approaches have been taken to detect potential sensor errors: monitoring for implausible sensor values (which are usually erroneous), and redundant sensing. The first approach utilizes a monitoring system for the sensor states that identifies certain sensor failure conditions, such as, e.g., sensor values that fall outside an expected range, rates of change of sensor values that are physically impossible or highly unlikely, or loss and/or corruption of sensor data. If any of these conditions is observed, the system initiates fail-safe procedures. This approach is inherently limited in that it protects against only a finite number of specific failure modes; if these modes do not cover all possible failure conditions—which they rarely will in practice—some types of sensor failures may go unnoticed. For example, checking for out-of-range values does not help to identify in-range (and, thus, plausible), yet incorrect sensor values.

In the second approach, the sensors and their corresponding processing circuits are replicated; typically, two or more sensors for each measured quantity are provided. The outputs of the multiple sensors are compared to one another, and if they do not agree within certain tolerances, a sensor-failure flag is raised. This flag can be used to initiate fail safe procedures. Sensor duplication does not necessarily involve having two or more identical sensors measuring the same physical quantity, but may encompass arrangements where multiple different sensors measure the same quantity through different means. Although not targeting specific sensor-failure modes, the redundant sensing approach has various limitations as well. First, it adds cost and complexity to the system duplicating sensors and associated processing hardware and software. Second, for various practical reasons, such as physical design constraints or lack of space, it may be impossible or inconvenient to add redundant sensors. Third, it may be practically difficult to assure true independence of the redundant sensors, i.e., certain failure conditions may affect the redundant sensors in the same manner, thus obscuring incorrect readings. The redundant sensors may be subject to the same error not because they are all faulty, but rather because the manifestation of the quantity that is being measured is compromised. For example, redundant parallel position sensors may all measure deflection in a spring to determine the spring's compression force. If the material properties of the spring change, e.g., due to excessive yielding or hardening, all sensors will give equal, but erroneous force measurements.

Accordingly, there is a need for an alternative approach to detect sensor failures that has low rates of false positives (detection of sensor failures where the sensor readings are, in fact, correct) and false negatives (occurrence of sensor failures that are not detected), and avoids or mitigates the cost associated with sensor redundancy.

SUMMARY

The present invention provides systems and methods for monitoring robot sensor readings corresponding to different measured quantities for mutual consistency based on one or more constraints. The constraints are dictated by a model (or set of models) of the physical system being monitored, and each embodies a relationship between two or more physical quantities—measurements of these physical quantities must, accordingly, follow these constraints. This approach avoids the need for sensor redundancy, eliminates false negatives related to multiple dependent sensor readings of the same quantity, and facilitates detecting incorrect sensor readings, whether individually plausible or not, based on their inconsistency with other sensor readings. Further, it enables detecting problems with the monitored system itself, which may cause constraint violations despite properly functioning sensors.

In various embodiments, the constraints are derived from a physical model of the system to be monitored (e.g., the robot, an appendage thereof such as a multi-joint link or an arm, or a single joint of an appendage). System behavior may be modeled analytically, with mathematical equations (e.g., algebraic or differential equations) that typically include model parameters characterizing the inherent physical properties of the various system components. Alternatively, system behavior may be represented numerically, e.g., based on experimentally determined quantitative relationships between the physical quantities monitored by the sensors. In some embodiments, a functional model is derived from these experimentally determined relationships by fitting a mathematical function to the numerical data. In still other embodiments, numerical data from multiple sensors is used purely to distinguish between normal and fault states of the system based on experiment (e.g., using a conventional machine-learning algorithm), with no underlying model of system components or their interaction.

To monitor a complex system (e.g., the robot as a whole), multiple constraints are generally utilized. A simpler system or sub-system, on the other hand, may, in certain embodiments, allow capturing all of the physical quantities to be monitored within a single constraint. In various embodiments, a complex system is modeled with multiple constraints capturing fundamentally different aspects of the system behavior, such as electrical, mechanical, electromechanical, and/or thermal relationships between system components. For example, in one embodiment, a series elastic actuator operating a robot joint is modeled using a kinematics constraint associated with the motor and series spring of the actuator, a torque-generation constraint associated with torque generated by the motor and the position of the load (e.g., the robot components supported by that joint), a voltage-velocity constraint associated with current into the motor and angular velocity generated by the motor, a thermal-response constraint associated with a temperature of the motor and a power delivered thereto, a load-dynamics constraint associated with the angular position of the load and the torque applied to the load, or any combination of two or more of the aforementioned constraints.

During robot operation, when a constraint is violated beyond an associated specified threshold, a sensor inconsistency is registered, indicating that at least one of the sensor readings in the constraint is erroneous or the monitored system (or sub-system) itself has failed. The higher the fidelity and accuracy of the physical model are, the tighter can the violation thresholds generally be set. Moreover, the thresholds may be varied to tune error detection to a desired sensitivity within a sensitivity range—e.g., from detecting (and acting upon) only gross errors to detecting more subtle inconsistencies. Once a sensor inconsistency has been detected, the robot initiates appropriate fail-safe procedures. In some embodiments, a safe shut-down is automatically initiated. In other embodiments, robot operation is halted only temporarily, and resumed when all constraints are once again met. In certain embodiments, a self-calibration procedure is utilized to re-calibrate the sensors, and robot operation is resumed thereafter. In some embodiments, robot operation is not interrupted at all, but a warning is issued to the user; this response is appropriate if the constraint violation is not critical (e.g., does not present an acute safety risk).

In one aspect, the invention is directed to a method for monitoring a robot that includes a series elastic actuator (with a motor, a gearbox, and a series spring connected to a load) and a plurality of sensors associated with the actuator for sensor failure; the sensors monitor the state or action of the robot by measuring a plurality of respective physical quantities (e.g., with different sensors measuring different physical quantities). The method includes establishing one or more constraints relating readings of the plurality of sensors to each other (e.g., mutually independent constraints), and monitoring the sensor readings for violation of the constraint(s). In various embodiments, the constraints include a kinematics constraint associated with the motor and the series spring, a torque-generation constraint associated with torque generated by the motor and a position of the load, a voltage-velocity constraint associated with current into the motor and angular velocity generated by the motor, a thermal-response constraint associated with a temperature of the motor and a power delivered thereto, a load-dynamics constraint associated with the angular position of the load and the torque applied to the load, or any combinations thereof; certain embodiments utilize the kinematics constraint, the torque-generation constraint, as well as the voltage-velocity constraint. Establishing the constraints may involve modeling at least a sub-system of the robot. The constraints may be or include one or more analytical relationships between some or all of the measured physical quantities (e.g., algebraic, differential equation, or integral equations), or one or more numerical (e.g., experimentally established) relationships between some or all of the measured physical quantities.

Monitoring the sensor readings for violation of the constraint(s) may involve setting a violation threshold for each constraint, computing a value (or values) associated with the constraint(s) based on the sensor readings, filtering the value(s) (e.g., by computing a time average), and comparing the filtered value(s) against the respective violation threshold(s); when the violation threshold is exceeded for any constraint, a violation of that constraint is declared. The violation threshold may be set based, at least in part, on the desired sensitivity to errors and/or on the fidelity of the model on which the constraints are based. Upon violation of any of the constraint(s), a safe shut-down procedure may be initiated. Alternatively, robot operation may be (temporarily) halted, the plurality of sensors may be re-calibrated, and/or a robot user may be alerted to the violation.

In another aspect, the invention is direct to a robot including a series elastic actuator (having a motor, a gearbox, and a series spring connected to a load), a plurality of sensors measuring a plurality of respective physical quantities associated with the series elastic actuator (different sensors typically measuring different quantities) to thereby monitor a state or action of the robot, and a computational facility monitoring the robot for sensor failure. The computational facility monitors the plurality of sensor readings for violation of one or more constraints (e.g., a plurality of constraints that are independent of one another) relating readings of the plurality of sensors to each other; the constraints include a kinematics constraint associated with the motor and the series spring, a torque-generation constraint associated with torque generated by the motor and a position of the load, a voltage-velocity constraint associated with current into the motor and angular velocity generated by the motor, a thermal-response constraint associated with a temperature of the motor and a power delivered thereto, a load-dynamics constraint associated with the angular position of the load and the torque applied to the load, or any combinations thereof (such as the combination of kinematics, torque-generation, and voltage-velocity constraints). The constraint(s) may be based on a model of the series elastic actuator, and may include an analytical and/or a numerical relationship between at least some of the measured physical quantities.

In some embodiments, the computational facility includes a deviation-computation module for computing one or more values associated with the constraint(s) based on the sensor readings, a filter module for filtering the computed value(s) (e.g., by averaging the value(s) over time), and a comparator module for comparing each filtered value against a respective violation threshold set for the constraint with which the value is associated. The violation threshold may be set at least in part based on the fidelity of the model and/or a desired sensitivity to errors. In some embodiments, the computational facility further includes a failure-response module for causing, upon violation of any of the constraints, a safe shut-down procedure, interruption of robot operation, re-calibration of at least some of the plurality of sensors, or issuance of an alert to a user of the robot.

A further aspect relates to a controller for monitoring a plurality of sensors measuring physical quantities associated with a series elastic actuator including a motor, a gearbox, and a series spring connected to a load. The controller includes signal input ports for receiving readings from the plurality of sensors, a memory storing at least one constraint relating the readings of the plurality of sensors to each other (including a kinematics constraint associated with the motor and the series spring, a torque-generation constraint associated with torque generated by the motor and a position of the load, and/or a voltage-velocity constraint associated with current into the motor and angular velocity generated by the motor), and a processor monitoring the plurality of sensor readings for violation of the constraint(s).

BRIEF DESCRIPTION OF THE DRAWINGS

The foregoing will be more readily understood from the following detailed description of the invention, in particular, when taken in conjunction with the drawings, in which.

DETAILED DESCRIPTION

Figure 1A:
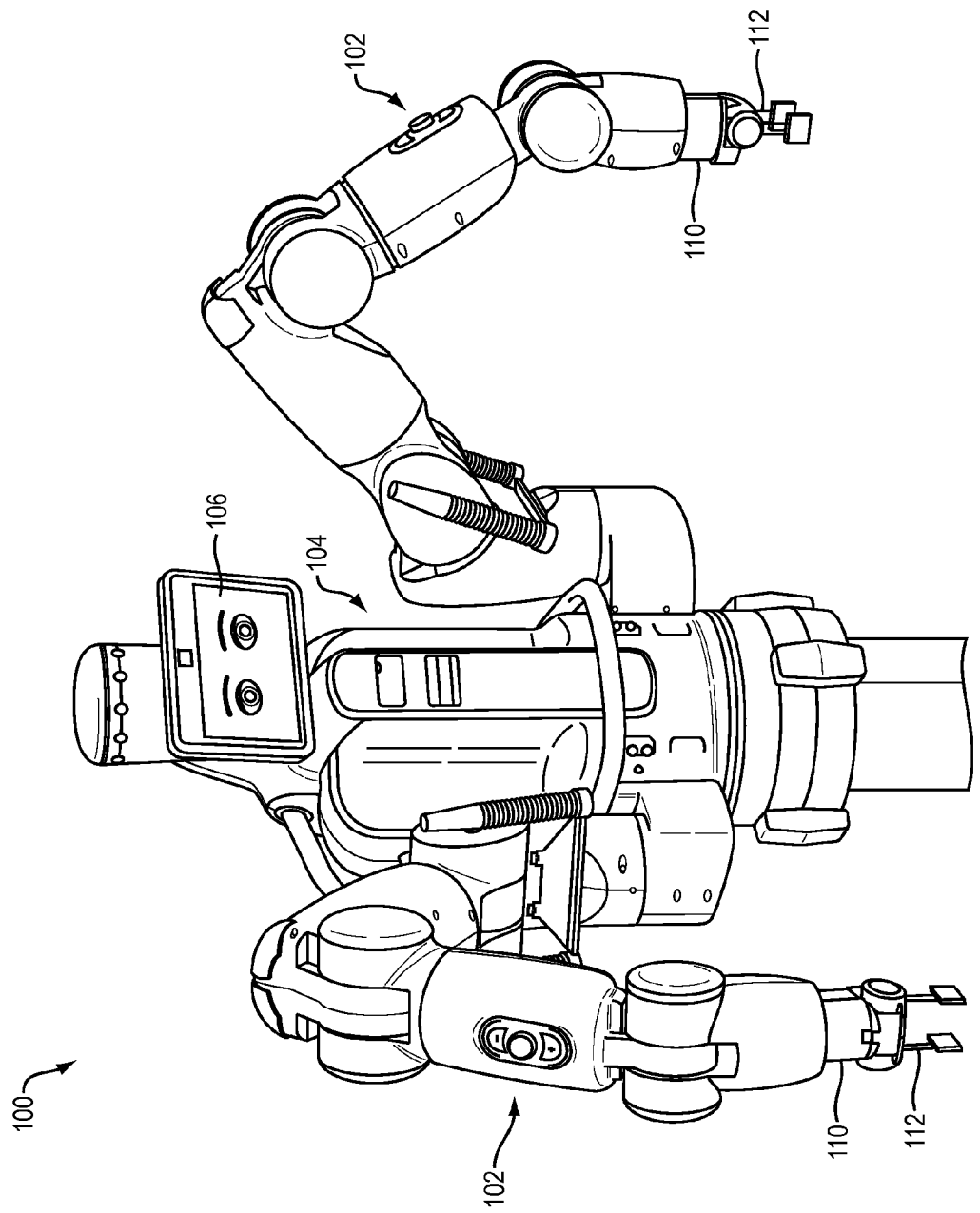
FIG. 1A illustrates a robot in accordance with various embodiments.
Figure 1B:
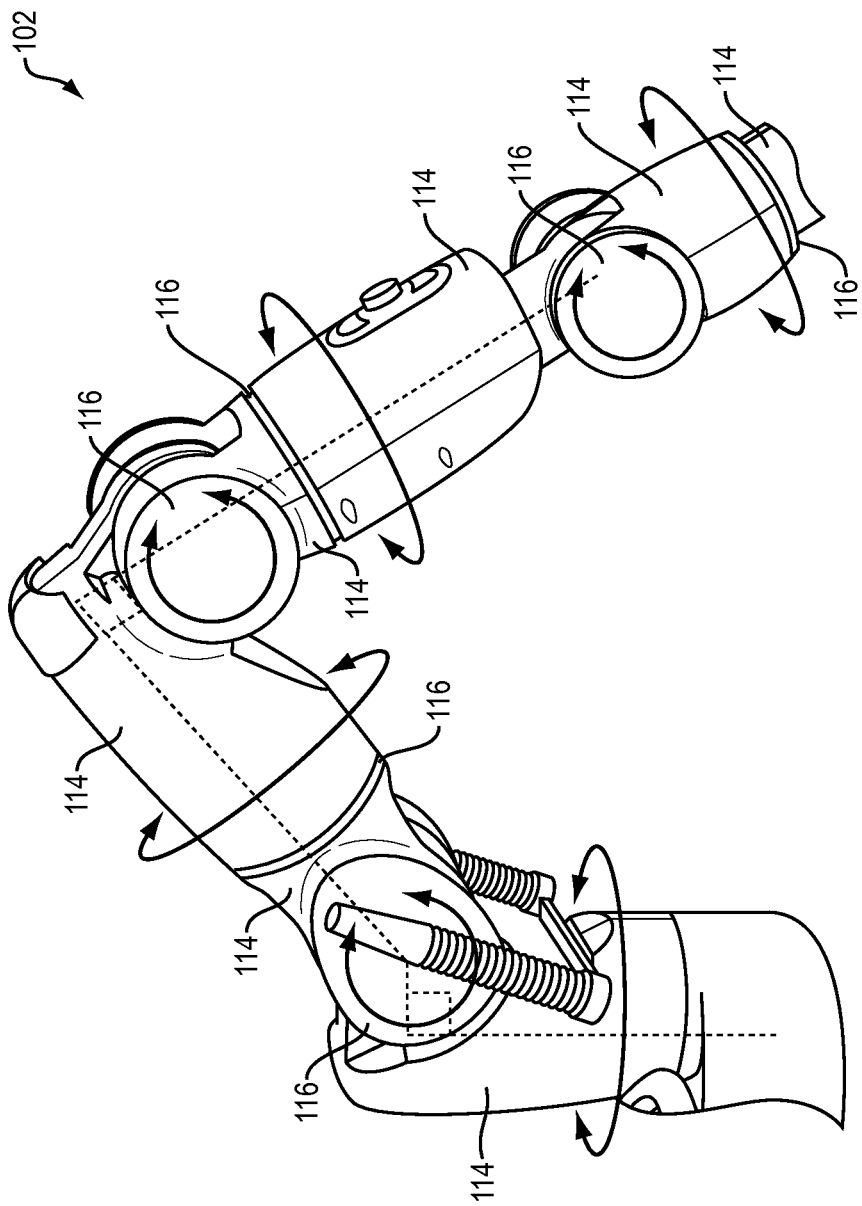
FIG. 1B shows a close-up of a robot arm in accordance with various embodiments.

The present invention provides approaches for monitoring robots for sensor consistency so as to detect sensor failures or, in some circumstances, problems with robot operation; FIG. 1A shows an exemplary robot 100 where these approaches may be employed. In the illustrated embodiment, the robot 100 includes two appendages 102, or "robot arms," connected to a robot body 104, as well as a user interface including a screen 106 and various mechanical controls (such as buttons and touch pads) that facilitate user input. Each appendage 102 has a wrist 110 with a parallel-jaw gripper 112 mounted thereto as an end-effector. FIG. 1B provides a close-up view of a robot arm 102. The arm 102 includes seven links 114 connected in series by one-dimensional rotary joints 116 that collectively provide seven degrees of freedom. As indicated by the arrows in FIG. 1B, each joint 116 either serves as a hinge that allows an angle to vary between two links 114 (i.e., allows the links to rotate around an axis through the joint that is perpendicular to the axes of the links), or facilitates rotation of the more distal link 114 around its central axis (i.e., an axis connecting the joints on either end of that link). Of course, the robot 100 depicted is only one particular example; in general, robots in accordance herewith may include, e.g., fewer or more than two appendages, different numbers of links and joints in an appendage, different types of joints (e.g., slip joints, universal joints, etc.), different types of end-effectors (e.g., suction grippers), an overall different configuration of the various robot parts (such as the body and appendages), etc.

The robot 100 typically operates in force-control mode, position-control mode, velocity-control mode, impedance-control mode, or admittance-control mode. In any of these modes, the actuators apply specified forces to the joints 114 in accordance with commands received from joint-level controllers. The joint-level controllers, in turn, receive commands from a higher-level robot controller that monitors and alters robot positions, kinematics, dynamics, and forces. The robot controller may be part of or in communication with a computational facility (described in detail below with reference to FIG. 4), which computes the forces and torques required for the performance of the robot's tasks while (typically) compensating for the gravity of the robot arm 102. This computation utilizes a three-dimensional self-model of the robot 100 (i.e., a data structure representing the geometries, masses, and structural relationships between the robot parts as well as the robot's current configuration, including parameters indicative of the positions and orientations of the links 114 of the arms 102) as well as feedback from sensor measurements to ensure that the robot 100 operates as intended.

Figure 2:
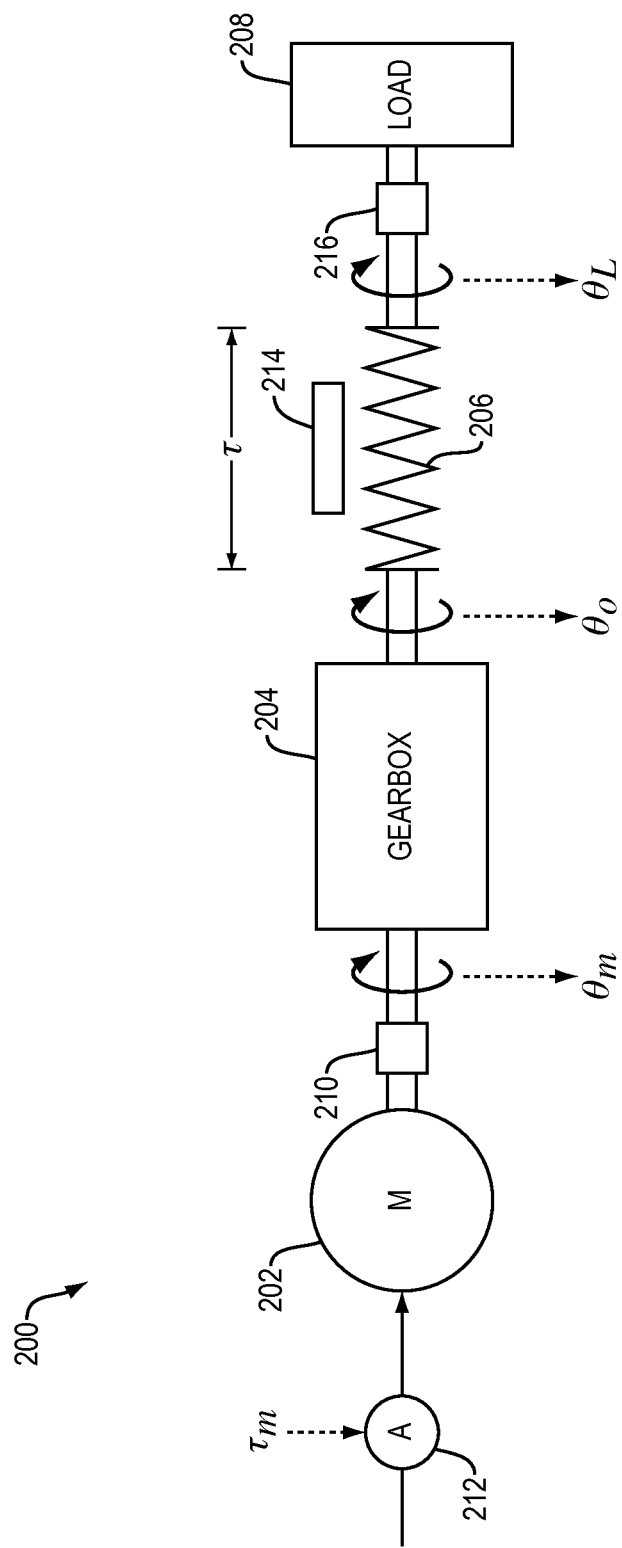
FIG. 2 schematically illustrates a series elastic actuator in accordance with various embodiments.

In various embodiments, the actuators operating the robot joints 114 are series elastic actuators (SEAs) as described, for example, in U.S. Pat. No. 5,650,704, issued on Jul. 22, 1997, which is hereby incorporated herein by reference in its entirety. FIG. 2 provides a conceptual schematic of an SEA 200, including indications of the various sensor outputs. As illustrated, an SEA for a rotary joint generally includes a motor 202, a gearbox 204, and a series elastic element 206 through which the load 208 is transmitted, such as a torsional spring connected in series between the gearbox 204 and load 208. The load 208 at a particular joint 114 includes all robot components (e.g., appendage links 114, other joints 114, etc.) distal to that joint as well as any object the robot carries with the respective arm 102—in other words, everything that contributes to the external torque applied to the joint 114. To support the load 208, the motor 202 is driven by an adequate electrical current, as computed by the computational facility.

The motor 202 is typically equipped with a position sensor or encoder 210, such as, e.g., a set of Hall-effect sensors and associated counting circuitry, which measures the angular motor position ($\theta_m$). Further, the motor 202 may include an Ampere-meter 212 measuring the electrical drive current ($i_m$). A spring deflection sensor (SDS) 214 measures the angle that the spring deflects, from which the spring torque ($\tau_{SEA}$) can be inferred; the SDS 214 may, for instance, utilize a potentiometer that measures spring deflection, an optical sensor that measures deflection or relative motion between the ends of the spring, or a magnetic sensor that measures changes in magnetic field as a magnet attached to one end of the spring moves relative to the other end. Alternatively, the spring force (or torque) may be measured directly, e.g., through a strain-based load cell that measures forces in series with the spring, or with a piezo-electric transducer. An output position sensor 216, such as, e.g., a magnetic angle encoder (MAE) on the output, measures the output angle of the joint, i.e., the angular position ($\theta_L$) of the load. The drive current ($i_m$) of the motor 202 is set (e.g., by a conventional algorithm executing on the computational facility) taking into account measurements of the angular motor position ($\theta_m$), the spring torque ($\tau_{SEA}$), and the output angle ($\theta_L$); actuator control is, thus, sensitive to sensor errors in any of these three quantities. The SEA may be equipped with alternative or additional sensors, which, in general, measure any kind of kinematic, dynamic, or other mechanical quantity, or any electrical, magnetic, thermal, or other physical quantity associated with the SEA.

In accordance herewith, sensor-based monitoring of a robot or sub-system thereof generally involves modeling the (sub-)system of interest using suitable modeling assumptions. The model may have varying degrees of complexity and refinement (e.g., reflecting more or less idealized assumptions) corresponding to varying levels of accuracy and fidelity to the actual, physical system behavior; the complexity of the model is generally reflected in the complexity of the constraints (e.g., the number of terms included in a constraint). For example, while the basic SEA model treats the gearbox 204 as an ideal element characterized uniquely by its gear ratio, a more detailed, refined model may account for resonant dynamics of the gear train. If this modeling assumption is incorporated, the constraints must reflect them accordingly.

Furthermore, the comprehensiveness with which the system's behavior is covered is, in general, a function of the number of constraints—each constraint typically captures a different aspect or facet of system operation. For example, using a basic (yet for many applications sufficient) model of an SEA, the measured quantities listed above and their interdependence can be completely captured with three independent physical constraints spanning the mechanical and electrical domains: a kinematics constraint, a torque-generation constraint, and a voltage-velocity constraint; these constraints are derived from the equations of motion of the mechanical system, the electrical equations governing the motor, and their coupling. However, other constraints can be identified and may be used, alternatively or in addition to these three constraints, to monitor sensor readings associated with an SEA for consistency. Given a particular model, relationships between all the sensor readings to be monitored are preferably captured in as few constraints as possible (i.e., only as many as necessary for the given desired coverage of the model), resulting in a set of mutually independent constraints (i.e., constraints that cannot be mathematically derived from one another); a minimal set of constraints avoids unnecessary computations and engineering efforts in implementing the constraints. However, the use of dependent constraints (i.e., constraints that can be derived from other constraints), which provides redundant information, is also within the scope of the present invention.

In various embodiments, the model of the (sub-)system to be monitored is based on an analytical understanding of the system (i.e., knowledge of the system components, their individual characteristics, and their interrelations in the overall system configuration) and mathematically expressed in the form of analytical equations, such as algebraic equations or differential equations (which may be integrated in real-time if the constraint is dynamic). (The term "equations" is herein meant to encompass both mathematical equalities and mathematical inequalities.) These equations typically include model parameters, such as, e.g., a gear ratio characterizing the gearbox 204 of an SEA and a spring constant capturing the elasticity of the series spring 206. The model parameters may be nominal parameters known by design. Alternatively, to increase model fidelity, the model parameters may be experimentally identified and measured, e.g., during manufacturing or during a subsequent calibration procedure. In some embodiments, model parameters are determined statistically based on multiple representative samples of the robot joint (or other modeled object), and in some embodiments, they are determined for each individual joint (or other object).

Alternatively to modeling system behavior analytically, the relationships between the various monitored physical quantities may be determined empirically and captured in a numerical model. For example, prior to deployment of the robot for its regular tasks, the robot may be operated to undergo various states consistent with normal operation, and the plurality of sensors may be read out for the different states to obtain correlations between them for a range of sensor values; this is generally done under conditions that assure reliability of the measurements (e.g., by temporarily using redundant sensors). In some embodiments, the empirical characterization of system behavior is done without regard to the components and configuration of the system; in other words, the robot (or a sub-system thereof to be modeled) is treated as a "black box." Constraints describing normal system behavior and properly functioning sensors may be ascertained using, e.g., machine-learning, neural network, evolutionary or similar approaches known to persons of skill in the art.

In other embodiments, the experimental characterization of the system is informed by a functional understanding of system components and their interrelations. For instance, among all the quantities to be monitored, small sub-sets of (e.g., two) quantities that are known to be interdependent may be measured in isolation so as to determine a functional relationship between them. In general, experimentally determined relationships between the physical quantities may be stored in numerical form (e.g., in a look-up table), or even in terms of an operator (e.g., expressed as a matrix) that, when applied to a collection of sensor readings, yields an output indicative of sensor consistency or inconsistency. Alternatively, in some embodiments, a mathematical function (i.e., an analytical expression) may be fit to the empirical data. This approach is particularly useful in cases where the analytical understanding of the system is insufficient to capture (or capture conveniently) all system features of practical significance, e.g., where higher-order effects contribute significantly to the overall system behavior, but are not readily ascertainable in isolation or not easily expressed in a computationally tractable form; advantageously, an experimentally determined numerical model inherently captures such effects. In certain embodiments, the model is in part analytical and in part numerical, featuring relationships of both types and/or even mixed relationships. In the following, various constraints applicable to SEAs will be described in detail.

Kinematics Constraint

The kinematics constraint relates the load position ($\theta_L$) as measured by the MAE 216, the motor position ($\theta_m$) as measured by the motor Hall (or other position) sensor(s) 210, and the torque ($\tau_{SEA}$) as measured (indirectly) by the SDS 214. The model parameters of the kinematics constraint include the gear ratio ($G_r$), the overall stiffness of the system ($k_{eq}$), and the amount of gear backlash ($\delta_{BL}$). The system's stiffness ($k_{eq}$) depends on the stiffness (or spring constant) of the spring ($k_{SEA}$) as well as the stiffness of the gear train ($k_{gear}$); in a series arrangement, the inverses of the two stiffnesses simply add. These system parameters are known for the SEA, either as inferred from its design or as determined via characterization experiments.

The deflection of the spring, i.e., the relative deflection of its endpoints (that is, the load angle ($\theta_L$) on one end and the gearbox output angle ($\theta_o$) on the other end), is related to the torque ($\tau_{SEA}$) by the stiffness of the spring ($k_{SEA}$) as follows (where (t) indicates time-dependent quantities):

$$\theta_L(t) - \theta_o(t) = \frac{\tau_{SEA}(t)}{k_{SEA}}$$

Similarly, the deflection between the motor position ($\theta_m$) (adjusted by the gear ratio ($G_r$)) and the output position ($\theta_o$) is due to the deflection in the gear train resulting from the elasticity of the gear train. Because the gear train and spring are in series, they share the same torque $\tau_{SEA}$, which is given by:

$$\theta_o(t) - \frac{\theta_m(t)}{G_r} = \frac{\tau_{SEA}(t)}{k_{gear}}$$

Adding these two relationships yields:

$$\theta_L(t) - \frac{\theta_m(t)}{G_r} = \frac{\tau_{SEA}(t)}{k_{SEA}} + \frac{\tau_{SEA}(t)}{k_{gear}} = \frac{\tau_{SEA}(t)}{k_{eq}}$$

Without any backlash, the above equation would be satisfied exactly. However, since the gears generally exhibit backlash (or "play," resulting from clearance between mating components), the relationship is modified as follows:

$$\left|\theta_L(t) - \frac{\theta_m(t)}{G_r} - \frac{\tau_{SEA}(t)}{k_{eq}}\right| \leq \delta_{BL}$$

These algebraic constraints state that the mismatch between motor position ($\theta_m$), MAE measurement ($\theta_L$), and spring deflection (as measured by the torque $\tau_{SEA}$) is bounded by the gear backlash.

Torque-Generation Constraint

The torque generated by the motor as sensed by the SDS ($\tau_{SEA}$) should be consistent with the current driven into the motor ($i_m$), the output position of the load ($\theta_L$), and the approximate second-order dynamics of the joint. The model parameters of this relationship include the inertia (J) and effective viscous damping (B) of the gearbox (damping resulting from friction between the gears), the stiffness of the series spring ($k_{SEA}$), as well as the motor torque constant ($k_t$) (which relates input current into the torque output by the motor) and the gear ratio ($G_r$).

When viewed from the output side of the gearbox, the gear train (characterized by its inertia (J)) is subject to damping torques (captured by the damping factor B), torques due to the elasticity of the series spring ($k_{SEA}$) at the output, and the torques applied by the motor ($\tau_m$). The balance of these forces results in the following equation of motion:

$$J\ddot{\theta}_o(t) + B\dot{\theta}_o(t) + k_{SEA}(\theta_o(t) - \theta_L(t)) = \tau_m(t) = k_t G_r i_m(t)$$

The torque applied by the motor is primarily determined by the motor current ($i_m$), its torque constant ($k_t$), and the gear ratio ($G_r$). (Since this equation of motion pertains to the output inertia of the gearbox, the motor torque is multiplied by the gear ratio to get an equivalent torque at the output.)

The torque that is applied to the load ($\tau_L$) is equal to the torque in the series elastic element ($\tau_{SEA}$), and is given by:

$$\tau_L(t) = k_{SEA}(\theta_o(t) - \theta_L(t))$$

The transfer function for the torque-generation constraint can be derived from the above two equations by a Laplace transform, which converts the equations from time-domain differential equations to frequency-domain algebraic equations. The transformed equations are given by:

$$Js^2\theta_o(s) + Bs\theta_o(s) + k_{SEA}(\theta_o(s) - \theta_L(s)) = \tau_m(s) = k_t G_r i_m(s)$$

and $$\frac{\tau_L(s)}{k_{SEA}} + \theta_L(s) = \theta_o(s)$$

Substituting the second equation into the first, and manipulating, yields the transfer function of the system:

$$\tau_L(s) = \frac{k_t \cdot G_r \cdot k_{SEA}}{Js^2 + Bs + k_{SEA}} i_m(s) - \frac{k_{SEA}(Js^2 + Bs)}{Js^2 + Bs + k_{SEA}} \theta_L(s)$$

where (s) denotes the Laplace differential operator. The first part of the transfer function characterizes the forward path dynamics of the system (i.e., that which is due to current control), and the second part characterizes the back-impedance of the system (i.e., the torques experienced by the load due to load motion $\theta_L$). Since the motor current ($i_m$), the load position ($\theta_L$), and the torque ($\tau_L = \tau_{SEA}$) are continuously measured, the relationship between those quantities can be computed and verified in real-time.

Instead of deriving an analytical equation that relates the measured torque ($\tau_{SEA}$) (which equals the torque applied to the load ($\tau_L$)) to the drive current ($i_m$), the relationship between the two may be determined experimentally for various frequencies covering a range of interest. The frequency-dependent response may then be fit with a numerical model, which inherently captures the SEA's full behavior, including effects that are harder to model analytically, such as higher-order dynamics, resonances, and nonlinear effects.

Voltage-Velocity Constraint

This constraint relates the voltage applied to the motor ($V_m$), the current measured in the motor ($i_m$), and the back electromotive force (EMF) as defined by the motor's velocity constant ($k_e$) and angular velocity ($\dot{\theta}_m$) based on the voltage balance at the motor.

A standard model for the motor is an RL-circuit, where the voltage ($V_m$) applied to the motor by the driving circuit equals the sum of the resistive load (characterized by resistance R), the inductive load (characterized by inductivity L), and the back EMF ($V_{emf}$):

$$V_m(t) = i_m(t)R = L\frac{di_m(t)}{dt} + V_{emf}(t)$$

The back EMF ($V_{emf}$) is directly related to the angular motor velocity ($\dot{\theta}_m$) by the motor velocity constant ($k_e$), resulting in:

$$V_m(t) = i_m(t)R + L\frac{di_m(t)}{dt} + k_e\dot{\theta}_m(t)$$

This is a sufficient representation of the voltage-velocity constraint since the motor voltage ($V_m$), motor current ($i_m$) and motor angular velocity ($\dot{\theta}_m$) are all measured. Further, for motors used in a robot SEA, the inductance of the motors is typically negligibly small, allowing the constraint to be simplified to:

$$V_m(t) = i_m(t)R + k_e\dot{\theta}_m(t)$$

Thermal-Response Constraint

When driving a robot joint actuator in general, or an SEA in particular, it is important to monitor the temperature of the motor coils to avoid overheating, which can otherwise result in permanent damage to the motors. To ensure that the temperature sensor is functioning properly, the consistency of the measured temperature (T) with the power delivered to the motor, as computed based on the measured motor current ($i_m$), may be checked. Accordingly, the SEA model is, in some embodiments, expanded to include a thermal-response constraint capturing this relationship. The thermal-response constraint may require, for instance, that the rate of change of the thermal energy of the motor equals the sum of the electrical energy dissipated in the motor due to its electrical resistance and the thermal energy loss to the environment. A simple first-order approximation of this constraint is:

$$m_{th}\frac{dT}{dt} = -R_{th}(T - T_\infty) + i_m^2 R$$

where $m_{th}$ is the thermal mass of the motor, $R_{th}$ is the thermal resistance to the environment, and R is the electrical resistance of the motor, T is the temperature of the motor, $T_\infty$ is the ambient temperature, and $i_m$ is the motor current.

Load-Dynamics Constraint

This constraint relates the angular position of the load ($\theta_L$) to the torque applied to the load ($\tau_L$), and captures the notion that the motion and torque at the output of an actuator joint should be consistent with the dynamics of the load downstream of the joint. The dynamics of the load may, for instance, be approximated by a second-order model:

$$\frac{\theta_L}{\tau_L} = \frac{1}{J_L s + B_L s + K_L}$$

where s denotes the Laplace differential operator, and $J_L$, $B_L$, and $K_L$ are the inertia, damping, and stiffness of the load, respectively.

In some embodiments, the robot as a whole is modeled as a multi-variable system. The dynamics of the joints may then be described in a vector equation:

$$M(\theta)\ddot{\theta}+C(\theta,\dot{\theta})\dot{\theta}+K(\theta-\theta_o)+g(\theta)=\tau$$

where M is the robot/load inertia matrix (which is a function of the current robot configuration, as captured in the robot's self-model), C is the Coriolis/damping matrix, K is the stiffness matrix, g is the gravitational vector, $\tau$ is the vector of torques applied on the joints, and $\theta$, $\dot{\theta}$, and $\ddot{\theta}$ are the vectors of joint angles, velocities, and accelerations. Accordingly, this constraint captures the relationship between the joint angles $\theta$ as measured by the MAEs, and the joint torques $\tau$ as measured by the SDS sensors.

The above-described constraints model various important aspects of SEAs in a fairly simple and straightforward manner. To increase model fidelity, additional characteristics and behaviors may be included and captured in additional constraints and/or additional terms included in the above constraints. For example, in some embodiments, the effects of parasitic stiffness attributable to the housing of the actuator, gear-train stiffness, and structural dynamics of the arm are explicitly modeled; suitable terms may be included, in particular, in the kinematic constraint, the torque-generation constraint, and the load-dynamics constraint. Further, the effects of joint hysteresis and/or friction on the system (e.g., static friction) may be included; hysteresis and friction affect, in particular, the torque-generation constraint and the load-dynamics constraint. In general, simpler models reduce computational complexity, facilitating real-time consistency checks with low or moderate computational resources, at the cost of lower sensitivity as compared with more complex models.

Figure 3:
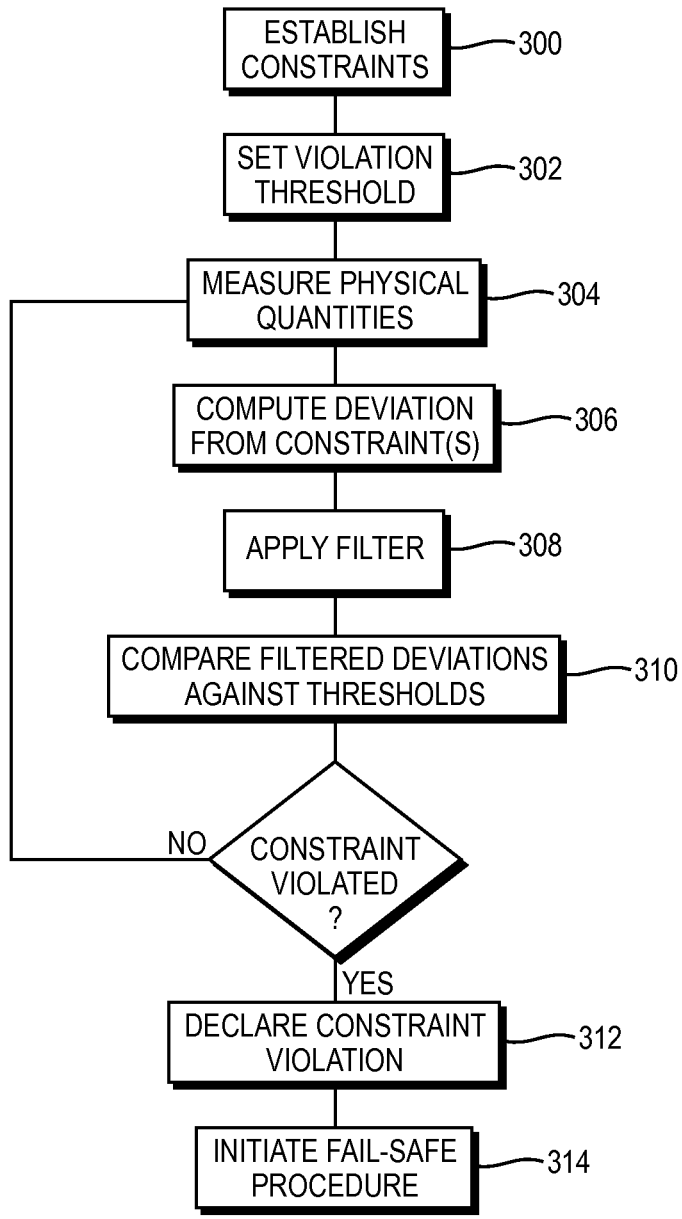
FIG. 3 is a flow chart illustrating a method for monitoring sensor consistency and detecting sensor failure in accordance with various embodiment.

FIG. 3 illustrates a method in accordance with various embodiments for monitoring sensor readings for mutual consistency based on constraints such as those described above. The method involves, first, modeling the system of interest (e.g., the robot or an individual SEA) to establish one more constraints on its behavior (step 300). Ideally, for a perfect model and perfect sensor readings, these constraints should be satisfied exactly during robot operation. In practice, however, model imperfections and noisy sensor readings generally cause deviations from the constraints even in the absence of any sensor failure or other problem. Accordingly, to discriminate between normal operation and failure conditions, violation thresholds are established (step 302) for all constraints, and only deviations from the constraints that exceed the set thresholds cause a sensor inconsistency to be declared. The violation thresholds may be set based on the fidelity and/or accuracy of the model. Higher model accuracy generally allows for tighter thresholds, which, in turn, facilitate detecting more subtle inconsistencies. For less accurate models, the thresholds are typically set wide to enable useful robot operation (e.g., avoid frequent interruptions due to declared inconsistencies that result from model imperfections rather than sensor failure), and as a result, sensor consistency checks capture only gross mismatches. Suitable thresholds for a given model may be set based on estimates of the model inaccuracies (and/or sensor noise) or determined experimentally, e.g., based on measured false positives and false negatives of declared sensor inconsistencies. Conversely, for a desired sensitivity, i.e., given violation thresholds, the model may be adjusted to include as much detail as necessary to reliably detect violations of the set thresholds. Typically, the constraints and violation thresholds are established at the outset, prior to robot operation and monitoring.

During robot operation, physical quantities characterizing the behavior of the system or sub-system(s) of interest (such as forces and/or torques; linear and/or angular positions, velocities, or accelerations, electrical currents and voltages, temperature, etc.) may be monitored with suitable sensors (step 304). Sensor readings for physical quantities that are linked by a constraint are generally acquired substantially simultaneously (i.e., any differences in the exact timing of the measurements are so small that the physical quantities do not change, or change only negligibly, throughout the time period needed to measure all quantities linked by the constraint). The sensor readings are then plugged into the constraint to compute a value indicative of the deviation of the measurements from the constraint (step 306). For example, for constraints expressed as mathematical equalities, the difference between both sides of the equation—which, ideally, ought to be zero— is computed.

In some embodiments, the computed deviation values are filtered (step 308) prior to comparison with the violation threshold. For example, to separate transient constraint violations due to sensor noise from actual (and permanent) failure-based violations, the constraint deviations may be filtered with a moving-average filter ($\Phi_{MA}$), low-pass filter, band-pass filter, median filter, finite impulse response (FIR) filter, or infinite impulse response (IIR) filter, or otherwise time-averaged. The integration time span of the filter may be tuned, e.g., experimentally, based on the noise levels of the sensors. The averaged or filtered deviations are then compared against the violation thresholds (step 310), and if a threshold is exceeded, a violation of that constraint is declared (i.e., a sensor inconsistency is raised) (step 312).

Specifically, indicating the violation threshold with $\epsilon_x$ (where x is a placeholder for a label indicative of the associated constraint) and denoting the filtering step with the operator symbol $\Phi_{MA}\{.\}$ (the quantity in braces being filtered), the kinematics constraint is declared violated when:

$$\Phi_{MA}\left\{DB_{\delta_{BL}}\left(\theta_L(t) - \frac{\theta_m(t)}{G_r} - \frac{\tau_{SEA}(t)}{k_{eq}}\right)\right\} \geq \epsilon_{Kin}$$

where the notation $DB_\delta(.)$ denotes a dead band function that admits a value of zero when the absolute value of the quantity in parenthesis is less that $\delta_{BL}$.

Similarly, the torque-generation constraint is declared violated when:

$$\Phi_{MA}\left\{\left|\tau_L(s) - \frac{k_t \cdot G_r \cdot k_{SEA}}{Js^2 + Bs + k_{SEA}}i_m(s) - \frac{k_{SEA}(Js^2 + Bs)}{Js^2 + Bs + k_{SEA}}\theta_L(s)\right|\right\} \geq \epsilon_{Torque}$$

The voltage-velocity sensor constraint is declared violated when:

$$\Phi_{MA}\{|V_m(t) - i_m(t)R - k_e\dot{\theta}_m(t)|\} \geq \epsilon_{VVC}$$

The thermal-response constraint is declared violated when:

$$\Phi_{MA}\left\{\left|m_{th}\frac{dT}{dt} + R_{th}(T - T_\infty) - i_m^2 R_m\right|\right\} \geq \varepsilon_{Temp}$$

The load-dynamics constraint will be declared violated when:

$$\Phi_{MA}\left\{\left|\theta_L - \tau_L \frac{1}{J_L s^2 + B_L s + K_L}\right|\right\} \geq \varepsilon_{Load}$$

Violation of any of the constraints indicates failure of one or more of the sensors, failure of the (sub-)system being monitored, or both. Failure of an SEA, for example, can occur when certain components break, or when they slip relative to each other, e.g., in the event of excessive torques, in a manner that is outside the ranges of normal operation. Under such circumstances, both the kinematics constraint and the torque-generation constraint would typically be violated. Regardless whether a constraint violation is due to break-down of normal system operation or due to sensor failure, it justifies initiation of a fail-safe procedure (step 314). In some embodiments, this involves safe shut-down of the robot. Shut-down generally involves disabling the joints, and may be accomplished by cutting off power going into the motors (e.g., by disabling the respective drives), by shortening the coils in the motor to provide dynamic braking that dissipates mechanical energy in the robot limbs utilizing electro-mechanical damping effects, or by actively braking the system to a zero-velocity state; the goal is, in each case, to bring the robot to rest. In other embodiments, robot operation is interrupted, and if and when the sensors readings return to values that are consistent with all constraints, operation resumes. Reversible sensor failure can, for example, result from temporary temperature increases that vanish after a suitable cooling-off period, from mechanical instabilities that subside when the robot is stopped, from spurious motions of sensor components (e.g., motions of the magnets in SDS sensors, which affect the magnetic field observed by the sensing chip), or in cases of excessive sensor drift on the output signal that causes the sensor reading to meander from consistent to inconsistent regimes. In certain embodiments, the robot is, upon detection of a sensor failure, placed into self-calibration mode to re-calibrate the sensors that are amenable to calibration in situ. During such self-calibration, the robot sequentially assumes a number of different postures for which the torques applied to the different joints (due to the gravitational force acting on the links downstream thereof) are known from the robot's self-model. From measured sensor values and the known torques, sensor parameters may be determined. Following re-calibration of the sensors, the robot may resume its operation, provided the sensor readings are now consistent with the constraints. In some embodiments, in particular where sensor failures are detected with high sensitivities, not all levels of constraint violations are critical. For constraint violations within certain ranges (e.g., below a second set of higher, critical violation thresholds), the robot may continue to operate, and the violation of the (lower) violation threshold merely triggers issuance of a warning to the user, e.g., recommending that the robot be serviced soon.

The computational facility providing the functionality required for monitoring the sensor readings to determine when constraints are violated (e.g., when the filtered constraint deviations exceed the specified violation thresholds) can be implemented, for example, by one or more embedded programmable microprocessors, digital signal processors, field-programmable gate-arrays, application-specific integrated circuits, a suitably programmed general-purpose computer, or generally any suitable combination of hardware and/or software. Typically, the computational facility includes at least a processor and associated memory (which may store, e.g., a computational representation of the constraints, the violation thresholds, and, optionally, the robot's self-model) as well as one or more buses that facilitate communication therebetween and/or with the sensors and the robot controller. The computational facility may be embedded in the body or appendages of the robot, or, alternatively, be provided separately therefrom in communication with the robot via a wired or wireless connection (e.g., via Ethernet, Bluetooth, WLAN, the Internet, etc.).

Figure 4A:
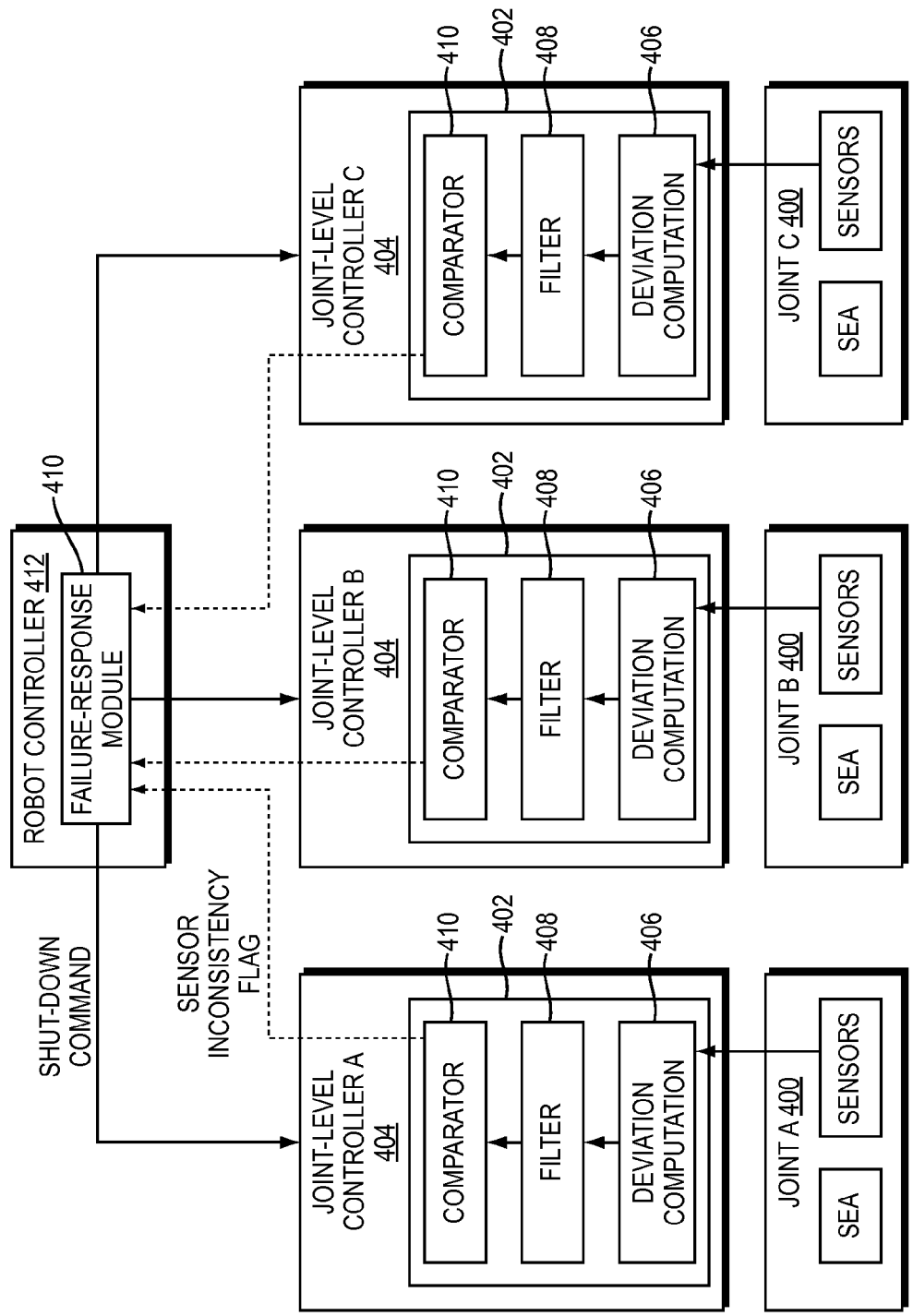
FIG. 4A illustrates an exemplary control facility for sensor-consistency monitoring and sensor-failure detection that is embedded in a robot joint controller in accordance with various embodiments.
Figure 4B:
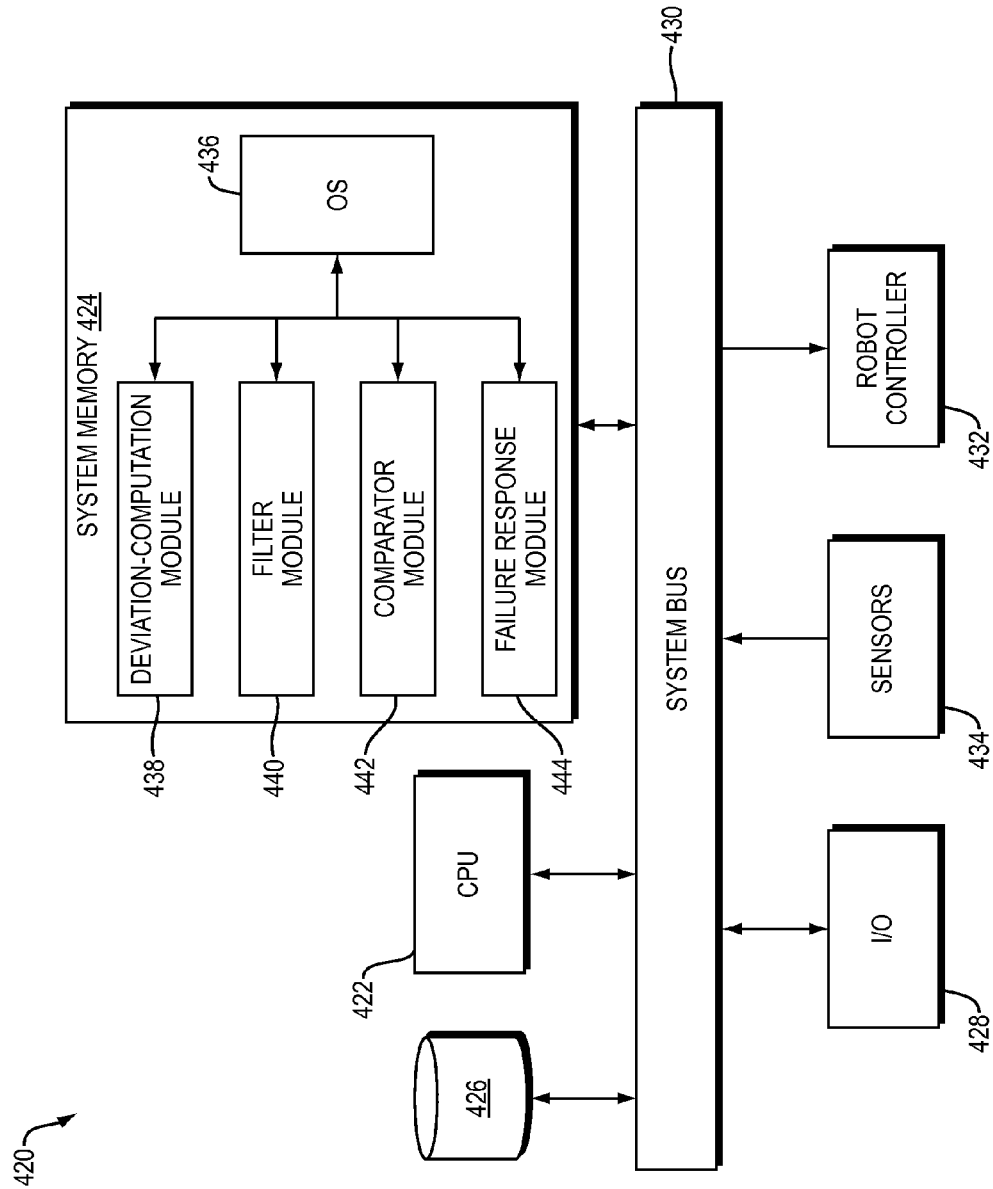
FIG. 4B illustrates an exemplary centralized control facility for monitoring sensor consistency and detecting sensor failure in accordance with various embodiments.

In some embodiments, the robot includes multiple independently operating computational facilities. For example, as shown in FIG. 4A, each robot joint 400 may be monitored for sensor consistency by an associated dedicated computational facility 402, which may be integrated in the joint-level controller 404 and, optionally, embedded in or near the joint 400 (e.g., in an adjacent link of the appendage). The computational facility 402 for an individual joint 400 may include multiple modules (e.g., implemented as separate circuits or different software modules) for processing the sensor signals associated with that joint: a deviation-computation module 406 may receive the sensor signals and process them to establish the level of deviation from the constraint(s); a filter module 408 may time-average or otherwise filter the computed deviations; and a comparator module 410 may compare the filtered values against the violation thresholds set for the respective constraints. If a sensor inconsistency is detected for any of the joints 400, the computational facility 402 of that joint may escalate a sensor inconsistency flag to the robot controller 412, which may include a failure-response module that, when triggered by a declared inconsistency, initiates robot shut-down (or another suitable procedure) via control signals to all joint-level controllers 404. Implementing the sensor-consistency checks in the same control facility that provides real-time control of the SEA (e.g., in the joint-level controller), which usually has spare computational capacity, may help to minimize overall system cost.

In some embodiments, the computational functionality for sensor consistency checks is implemented by a single central facility, e.g., the main computer that coordinates the motions of the entire robot (or at least an entire robot arm). Such centralization facilitates the use of robot models in which the physical quantities measured for different actuators are interdependent, as is the case, e.g., when the multivariable load-dynamics constraint described above is utilized. In one embodiment, illustrated in FIG. 4B, a general-purpose computer 420 provides the central computational facility. The computer 420 may include a processor (CPU) 422 and associated system memory 424 (e.g., random access memory (RAM)), one or more non-volatile storage devices 426 (e.g., one or more hard drives, CD-ROMs, DVDs, magnetic tapes, USB memory keys, or other conventional data storage media), a user interface 428 with input/output (I/O) devices (e.g., screen, keyboard, and mouse), and a system bus 430 that facilitates communication between these components. The system bus 430 also connects the computer with the robot controller 432 and the robot sensors 434. (Alternatively, the robot controller 432 may be implemented as a software application on the computer 420 and communicate, via the system bus 430, with the joint-level controllers.) The system memory 424 stores processor-executable instructions, typically including an operating system (OS) 436 that governs file access, memory allocation, and other low-level functionality, as well as one or more high-level applications 438, 440, 442, 444 for implementing the sensor-monitoring methods described herein. The high-level applications may include a module 438 for computing constraint deviations based on the sensor readings, a filter 440 for averaging the deviations over time or otherwise filtering them, a comparator module 442 for comparing the constraint deviations against the thresholds (which may be specified, e.g., by a user entering them via the user interface 428) and raising a sensor inconsistency flag when a constraint violation is detected, and a failure-response module 444 for initiating fail-safe procedures (such as shutdown) via commands to the robot controller 432 when a sensor inconsistency flag has been raised. The modules may be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages. Of course, the instructions implementing the various functions may be grouped and organized in many different ways; the depicted organization into a few discrete modules is exemplary only.

Sensor-consistency checks in accordance herewith may also be implemented by a stand-alone controller with signal input ports for receiving readings from the plurality of sensors, memory storing the constraints, and a processor monitoring the plurality of sensor readings for violation of the constraint(s). The controller may be programmable so as to allow customization of the constraints to the particular application. This allows the controller, in turn, to receive and process any types of sensor readings and, accordingly, monitor the sensors associated with any machine or part thereof.

The sensor consistency approach describe above—although explained herein with respect to SEAs for rotary joints—is generally applicable to any robot system (or, even more generally, any machine or portion thereof) that can be reliably modeled. For example, the approach can be straightforwardly extended to SEAs for linear joints, other types of actuators (whether used in robots or other machines), whole robot arm models, or other robot subsystems (e.g., thermal monitoring systems, vision sensors, range sensors, or other robot sensors). Accordingly, it will be apparent to those of ordinary skill in the art that other embodiments incorporating the concepts disclosed herein may be used without departing from the spirit and scope of the invention; the described embodiments are to be considered in all respects as only illustrative and not restrictive. Further, the terms and expressions employed herein are used as terms and expressions of description and not of limitation, and there is no intention, in the use of such terms and expressions, of excluding any equivalents of the features shown and described or portions thereof.

What is claimed is:

1. For a robot comprising (i) a series elastic actuator comprising a motor, a gearbox, and a series spring connected to a load and, associated therewith, (ii) a plurality of sensors for monitoring a state or action of the robot by measuring a plurality of respective physical quantities, a method of monitoring the robot for sensor failure, the method comprising:
establishing at least two constraints relating readings of the plurality of sensors to each other, the at least two constraints including at least two of a kinematics constraint associated with the motor and the series spring, a torque-generation constraint associated with torque generated by the motor and a position of the load, a voltage-velocity constraint associated with current into the motor and angular velocity generated by the motor, a thermal-response constraint associated with a temperature of the motor and a power delivered thereto, or a load-dynamics constraint associated with the angular position of the load and the torque applied to the load; and
monitoring the plurality of sensor readings for violation of any of the at least two constraints.

2. The method of claim 1, wherein establishing at least one of the constraints comprises modeling at least a subsystem of the robot.

3. The method of claim 1, wherein at least one of the constraints comprises an analytical relationship between at least some of the measured physical quantities.

4. The method of claim 3, wherein the analytical relationship comprises at least one of an algebraic equation, a differential equation, or an integral equation.

5. The method of claim 1, wherein at least one of the constraints comprises a numerical relationship between at least some of the measured physical quantities.

6. The method of claim 5, wherein the numerical relationship is established based on experimental data.

7. The method of claim 1, wherein monitoring the sensor readings for violation of at least one of the constraints comprises:
setting a violation threshold for at least one of the constraints;
computing at least one value associated with the at least one constraint based on the sensor readings;
filtering the at least one value;
comparing each of the at least one filtered value against the respective violation threshold; and
when the violation threshold is exceeded for any of the at least one constraint, declaring a violation of that constraint.

8. The method of claim 7, wherein the at least one constraint is established based on a model and the violation threshold is set based at least in part on a fidelity of the model.

9. The method of claim 7, wherein the violation threshold is set at least in part based on a desired sensitivity to errors.

10. The method of claim 7, wherein filtering the at least one value comprises computing a time average of the at least one value.

11. The method of claim 1, further comprising, upon violation of any of the at least two constraints, initiating a safe shut-down procedure.

12. The method of claim 1, further comprising, upon violation of any of the at least two constraints, halting robot operation.

13. The method of claim 1, further comprising, upon violation of any of the at least two constraints, re-calibrating at least some of the plurality of sensors.

14. The method of claim 1, further comprising, upon violation of any of the at least two constraints, alerting a robot user to the violation.

15. The method of claim 1, wherein different ones of the sensors measure different physical quantities.

16. The method of claim 1, wherein the at least two constraints comprises the kinematics constraint, the torque-generation constraint, and the voltage-velocity constraint.

17. A robot comprising:
a series elastic actuator comprising a motor, a gearbox, and a series spring connected to a load;

a plurality of sensors measuring a plurality of respective physical quantities associated with the series elastic actuator to thereby monitor a state or action of the robot; and a computational facility monitoring the robot for sensor failure by monitoring the plurality of sensor readings for violation of any of at least two constraints relating readings of the plurality of sensors to each other, the at least two constraints comprising at least two of a kinematics constraint associated with the motor and the series spring, a torque-generation constraint associated with torque generated by the motor and a position of the load, a voltage-velocity constraint associated with current into the motor and angular velocity generated by the motor, a thermal-response constraint associated with a temperature of the motor and a power delivered thereto, or a load-dynamics constraint associated with the angular position of the load and the torque applied to the load.

18. The robot of claim 17, wherein at least one of the constraints is based on a model of the series elastic actuator.

19. The robot of claim 17, wherein at least one of the constraints comprises at least one of an analytical relationship between at least some of the measured physical quantities or a numerical relationship between at least some of the measured physical quantities.

20. The robot of claim 17, wherein the computational facility comprises:
a deviation-computation module for computing at least one value associated with at least one of the constraints based on the sensor readings;
a filter module for filtering the at least one value; and
a comparator module for comparing each of the at least one filtered value against a respective violation threshold set for the constraint with which the value is associated.

21. The robot of claim 20, wherein at least one of the constraints is established based on a model and the violation threshold is set based at least in part on a fidelity of the model.

22. The robot of claim 20, wherein the violation threshold is set at least in part based on a desired sensitivity to errors.

23. The robot of claim 20, wherein the filter module averages the at least one value over time.

24. The robot of claim 17, wherein the computational facility comprises a failure response module for causing, upon violation of any of the at least two constraints, at least one of a safe shut-down procedure, interruption of robot operation, re-calibration of at least some of the plurality of sensors, or issuance of an alert to a user of the robot.

25. The robot of claim 17, wherein different ones of the sensors measure different physical quantities.

26. The robot of claim 17, wherein the at least two constraints comprises the kinematics constraint, the torque-generation constraint, and the voltage-velocity constraint.

27. A controller for monitoring a plurality of sensors measuring physical quantities associated with a series elastic actuator comprising a motor, a gearbox, and a series spring connected to a load, the controller comprising:
signal input ports for receiving readings from the plurality of sensors;
a memory storing at least two constraints relating the readings of the plurality of sensors to each other, the at least two stored constraints comprising at least two of a kinematics constraint associated with the motor and the series spring, a torque-generation constraint associated with torque generated by the motor and a position of the load, or a voltage-velocity constraint associated with current into the motor and angular velocity generated by the motor; and
a processor for monitoring the plurality of sensor readings for violation of any of the at least two stored constraints.

* * * * *